(12) United States Patent
Prabhu et al.

(10) Patent No.: US 6,670,788 B2
(45) Date of Patent: Dec. 30, 2003

(54) METHOD AND APPARATUS FOR MAXIMIZING HYBRID VEHICLE ENERGY MANAGEMENT

(75) Inventors: Sameer Prabhu, Westland, MI (US); Adam P. Shepperson, London (GB); James J. Klocinski, Saline, MI (US); Robert C. Borregard, Wyandotte, MI (US); William C. Mammen, Jr., Commerce Township, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 55 days.

(21) Appl. No.: 10/124,333

(22) Filed: Apr. 17, 2002

(65) Prior Publication Data

US 2003/0197489 A1 Oct. 23, 2003

(51) Int. Cl.[7] ............................. H02J 7/00; B60K 1/00
(52) U.S. Cl. ........................................... 320/104
(58) Field of Search ......................... 320/104, 140, 320/141, 162, 163, 166; 290/31, 32, 36 R, 38 R, 4 R, 4 C; 180/165, 65.3, 65.6; 123/339.14, 339.16; 318/105, 41, 139, 800–803; 363/16, 17, 55, 56, 95, 97, 98, 131, 132

(56) References Cited

U.S. PATENT DOCUMENTS

| | | | |
|---|---|---|---|
| 5,285,862 A | | 2/1994 | Furutani et al. ............ 180/65.4 |
| 5,552,681 A | | 9/1996 | Suzuki et al. ................ 318/139 |
| 6,002,603 A | * | 12/1999 | Carver ......................... 363/98 |
| 6,054,818 A | * | 4/2000 | Tabata et al. ................ 318/139 |
| 6,304,056 B1 | * | 10/2001 | Gale et al. .................... 320/104 |
| 6,420,793 B1 | * | 7/2002 | Gale et al. ..................... 290/34 |
| 6,426,608 B2 | * | 7/2002 | Amano et al. ............... 320/163 |
| 6,580,178 B1 | * | 6/2003 | Gale et al. ..................... 290/32 |

* cited by examiner

Primary Examiner—Pia Tibbits
(74) Attorney, Agent, or Firm—MacMillan, Sobanski & Todd LLC

(57) ABSTRACT

An apparatus for providing electrical power for a hybrid vehicle includes an integrated starter-generator and an inverter connected to an electrical energy storage device such as a capacitor and a battery by first and second switches respectively. A control turns the switches on and off in accordance with selected modes of operation to provide power from the capacitor to the integrated starter-generator and the battery and to provide power from the integrated starter-generator to the capacitor and the battery.

16 Claims, 3 Drawing Sheets

Fig. 3 POWER SWITCHERS CONTROL STRATEGY

| Switch Mode_Indicator | Signal |
|---|---|
| A. Mode Key Off | Inverter_Output_42V = 0 |
| | Switch_1 = OFF |
| | Switch_2 = OFF |
| B. Mode Key Accessory | Inverter_Output_42V = 0 |
| | Switch_1 = OFF |
| | Switch_2 = OFF |
| C. Mode Key On Engine Off | Inverter_Output_42V = 0 |
| | Switch_1 = OFF |
| | Switch_2 = OFF |
| D. Mode Key Stop | Inverter_Output_42V = 0 |
| IF Capacitor_Voltage > 45V | THEN % Charge Battery from Caps |
| | Switch_1 = PWM |
| | Switch_2 = PWM |
| ELSE | Switch_1 = OFF |
| | Switch_2 = OFF |
| E. Mode Key Start | Inverter_Output_42V = 0 |
| | Switch_1 = ON |
| | Switch_2 = OFF |
| F. Mode 5 Crank Time Out | Inverter_Output_42V = 0 |
| | Switch_1 = OFF |
| | Switch_2 = OFF |
| G. Mode 6 Power Generation | Inverter_Output_42V = Recommended_Voltage_Setting_42V |
| | Switch_1 = OFF |
| | Switch_2 = ON |
| H. Mode 7 Torque Boost | Inverter_Output_42V = 0 |
| | Switch_1 = ON |
| | Switch_2 = OFF |
| I. Mode 8 Auto Start | Inverter_Output_42V = 0 |
| | Switch_1 = ON |
| | Switch_2 = OFF |
| J. Mode 9 Auto Stop; Hold Caps Charged | Inverter_Output_42V = 0 |
| | Switch_1 = OFF |
| | Switch_2 = OFF |
| K. Mode A Regeneration: Charge Caps First, Then Battery | Inverter_Output_42V = 56V |
| IF Capacitor_Voltage < 56V | THEN % Charge Caps |
| | Switch_1 = OFF |
| | Switch_2 = PWM |
| ELSE % Charge Battery | Inverter_Output_42V = Recommended_Voltage_Setting_42V |
| | Switch_1 = OFF |
| | Switch_2 = ON |

METHOD AND APPARATUS FOR MAXIMIZING HYBRID VEHICLE ENERGY MANAGEMENT

FIELD OF THE INVENTION

The present invention relates to an apparatus for maximizing energy management in "soft" hybrid vehicles having multiple energy storage sources.

BACKGROUND OF THE INVENTION

The need for reduced vehicle emissions, increased fuel economy, increased electrical loads and better energy management has driven major automotive original equipment manufacturers (OEMs) to consider "soft" hybrid vehicles as one potential solution. A "soft" hybrid vehicle typically has an electric drive motor/generator unit operating at a higher voltage (e.g., 42V) coupled in parallel with a conventional internal combustion (IC) engine, which engine may be downsized to some degree. The motor/generator, also referred to as an Integrated Starter-Generator or ISG, takes the place of the conventional starter and alternator used with the IC engine, and performs additional functions including, but not limited to, torque assist, regenerative braking, automatic start-stop, power boost, and limited traction.

The move towards hybrid vehicles introduces a second torque source on the vehicle (in addition to the conventional IC engine), and systems and strategies are needed to coordinate these torque sources to meet the various vehicle application demands. The presence of an ISG allows the IC engine to be shut down when it is not needed for propulsion, recover the energy typically lost in braking, and use the energy from an energy storage system when additional power is needed in situations such as starting a vehicle from rest, or for merge or overtake situations. The energy storage system on the hybrid vehicle must meet the diverse requirements that each of the above-identified modes of operation demand, while still satisfying the conventional demands of the vehicle electrical system. A battery is well suited to meet the conventional energy requirements of vehicle operation such as supporting the electrical loads on the vehicle. A capacitor, on the other hand, is well suited to support transient situations requiring high power, e.g., torque boost to aid the engine in merge and overtake situations, or to recover the energy lost during braking (regeneration). These storage devices need to be managed appropriately depending on the mode of operation of the vehicle.

SUMMARY OF THE INVENTION

The present invention concerns an apparatus for providing electrical power for a hybrid vehicle including: an integrated starter-generator connected to an inverter; a capacitor means for storing electrical energy; a first switch means connected between the inverter and the capacitor means, or any other form of electrical energy storage means; a battery means for storing electrical energy; a second switch means connected between the inverter and the battery means; and a control means connected to the first and second switch means for selectively turning each of the first and second switch means on and off. The control means turns each of the first and second switch means on and off to charge the battery means from the capacitor means by pulse width modulation. The control means turns the first switch means on to provide electrical power from the capacitor means to operate the integrated starter-generator. The control means turns the second switch means on and of by pulse width modulation to charge the battery means from the integrated starter-generator.

The first switch means can include a diode permitting current flow from the inverter to the capacitor. The second switch means can include a diode permitting current flow from the battery to the inverter and the capacitor.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a table of signal states during various modes of operation of the apparatus shown in FIG. 1.

DESCRIPTION OF THE PREFERRED EMBODIMENT

Figure 1:
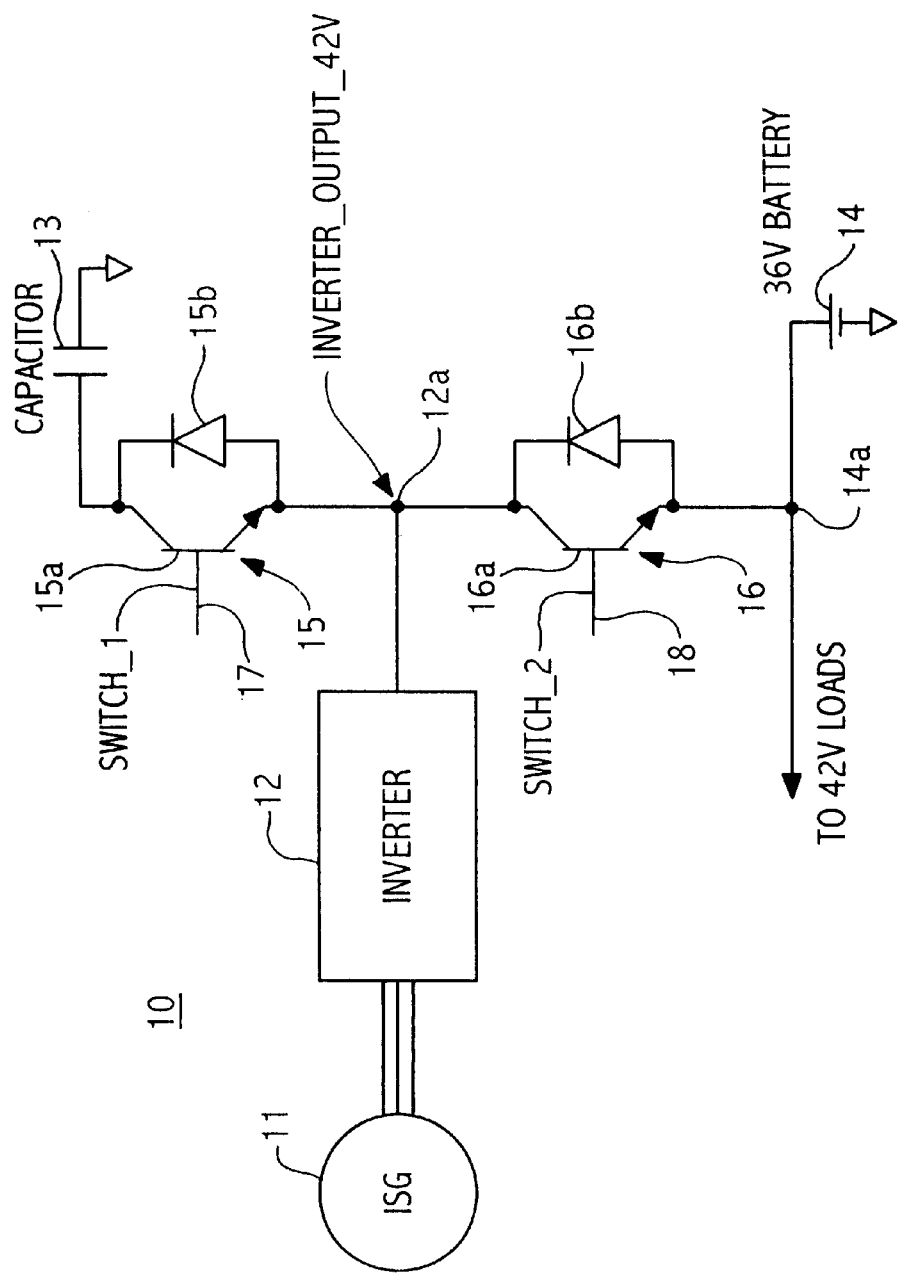
FIG. 1 is a circuit schematic of a dual energy source apparatus in accordance with the present invention.

A dual energy storage source 10 according to the present invention is schematically shown in FIG. 1. The system configuration of the source 10 includes an ISG (Integrated Starter-Generator) 11 connected to an output of an inverter 12 having an input that is connected to a capacitor 13 and a battery 14 in parallel. The capacitor 13 is representative of any suitable energy storage means. The inverter 12 is connected to the capacitor 13 through a first power switcher 15 and is connected to the battery 14 through a second power switcher 16. A first signal line 17 connected to the first power switcher 15 and a second signal line 18 connected to the second power switcher 16 receive control signals from a control circuit described below for turning the switchers on and off. The control circuit generates a Switch_1 control signal on the line 17 and a Switch_2 control signal on the line 18. A junction 14a of the second power switcher 16 and the positive polarity terminal of the battery 14 is connected to 42 volt loads (not shown) of the vehicle. An Inverter_ Output_42V signal is present at a junction 12a of the inverter 12 and the switches 15 and 16.

The power switchers 15 and 16 can include NPN MOSFET's 15a and 16a respectively, for example. The MOSFET 15a has a collector connected to the capacitor 13, a base connected to the line 17 and an emitter connected to the inverter 12. A diode 15b has a cathode connected to the collector and an anode connected to the emitter of the MOSFET 15a. The MOSFET 16a has a collector connected to the inverter 12, a base connected to the line 18 and an emitter connected to the battery 14. A diode 16b has a cathode connected to the collector and an anode connected to the emitter of the MOSFET 16a.

The power switchers 15 and 16 allow the capacitor 13 and the battery 14 to be selectively connected to the inverter 12, and also can be used together as the demands of the vehicle operation require increased power. Also, the power switchers 15 and 16 allow a voltage differential between the capacitor 13 and the battery 14 thereby permitting the capacitor voltage to be at a higher level than the battery voltage, which in turn allows the power storage capability of the capacitor 13 to be maximized. For example, the capacitor 13 can operate at a first voltage of approximately 56 volts while the battery 14 operates at a second voltage of 36 volts. The capacitor 13 is representative of a single capacitor or two or more capacitors connected in series and/or parallel to perform the same function. In a similar manner, the battery 14 is representative of a single battery or two or more batteries connected in series and/or parallel to perform the same function.

The "soft" hybrid vehicle (not shown) can operate in different modes including, but are not limited to, the following operational modes:

A. Key Off
B. Key Accessory (Position 1)
C. Key On Engine Off
D. Key Stop
E. Key Start
F. Crank Time Out (failed crank)
G. Power Generation (ISG generates power to meet energy demands of vehicle)
H. Torque Boost (Launch Assist)
I. Auto Start (Engine is cranked from the Auto Stop mode, since a propulsion demand is detected)
J. Auto Stop (Engine is shut down automatically when not needed for propulsion)
K. Regeneration (ISG puts load on the driveline to recover energy normally wasted in braking)

Figure 2:
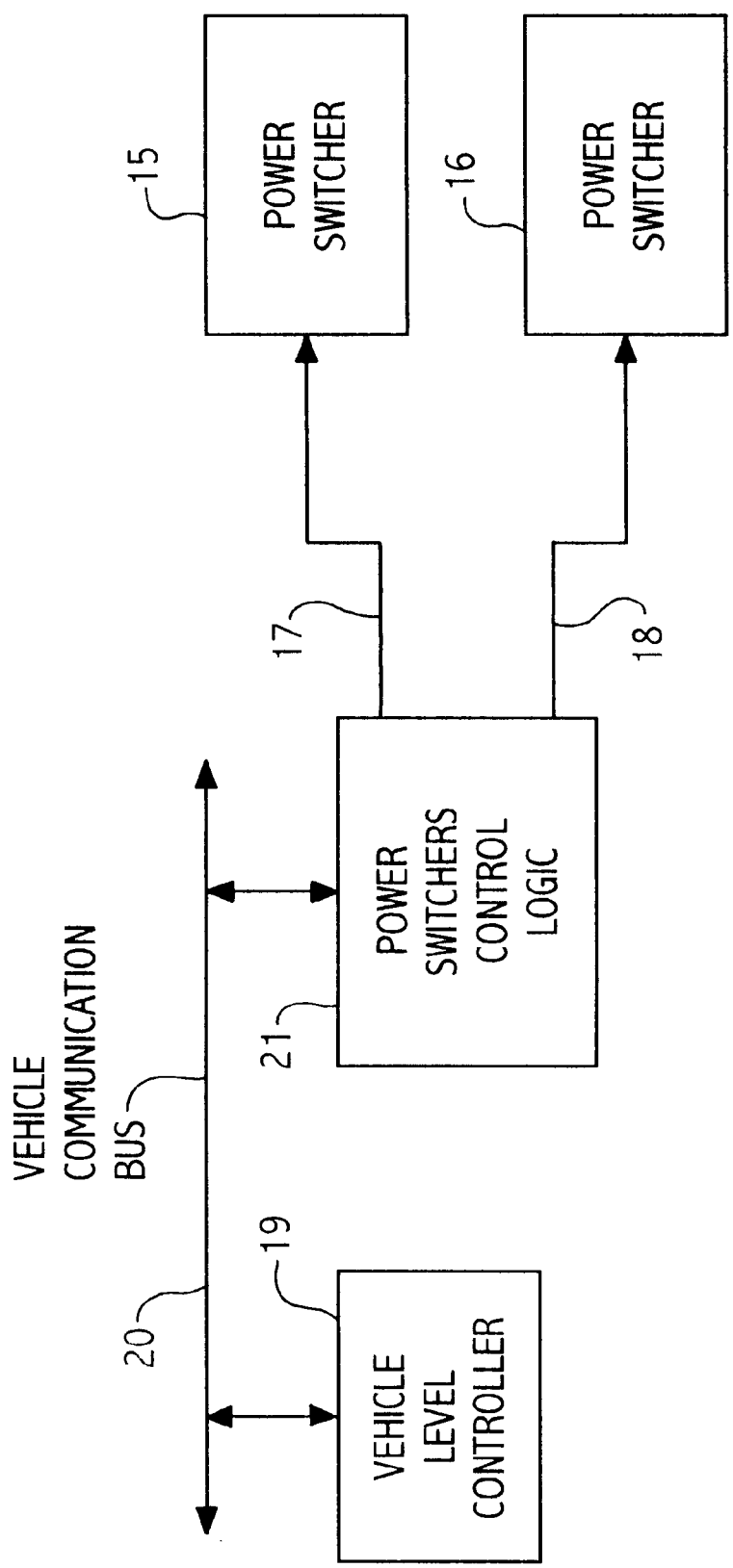
FIG. 2 is block diagram of a control circuit for the apparatus shown in FIG. 1.

The mode of operation of the vehicle is determined by a vehicle level controller 19 as shown in FIG. 2. The controller 19 is connected to a vehicle communication bus 20 provided for the transfer of sensor and control signals between various components of the hybrid vehicle. A power switchers control logic unit 21 is also connected to the bus 20 to receive suitable control signals from the vehicle level controller 19 dependent upon the selected mode of operation. Outputs from the power switchers control logic 21 are connected to the first signal line 17 and to the second signal line 18 to generate the control signals to turn the power switchers 15 and 16 on and off.

The term "mode indicator" is used hereafter to refer to the variable which contains information about the mode of vehicle operation. In the table of FIG. 3, the mode indicator signal "Switch Mode_Indicator" shown in the left column is generated by the vehicle level control 19 to instruct the power switcher control logic 21 to generate the control signals "Switch_1" and "Switch_2" shown in the right column resulting in the inverter signal "Inverter_Output_42V" also shown in the right column.

The power switchers control strategy according to the present invention also interfaces to a battery control strategy which typically recommends the output voltage setting for the ISG/Inverter system (referred to hereafter as the "Recommended_Voltage_Setting_42V") based upon the battery state of charge and health. The proposed power switchers control strategy will also recommend the inverter output voltage setting signal "Inverter_Output_42V" in addition to controlling the power switchers.

A potential control strategy for the power switchers 15 and 16 is shown in FIG. 3 and is described in more detail as follows:

A. In the Mode Key Off, the Inverter_Output_42V signal is at zero volts and the power switchers are turned off.

B. In the Mode Key Accessory, the Inverter_Output_42V signal is at zero volts and the power switchers are turned off.

C. In the Mode Key On Engine Off, the Inverter_Output_42V signal is at zero volts and the power switchers are turned off.

D. In the Mode Key Stop, the Inverter_Output_42V signal is zero volts. If the voltage across the capacitor 13 "Capacitor_Voltage" is greater than 42 volts, then a "% Charge Battery from Caps" signal causes the power switchers 15 and 16 to be pulse width modulated (PWM) by the control logic 21 with a duty cycle having an inverse relationship to the battery voltage to charge the battery 14. Otherwise (ELSE), the power switchers are turned off.

E. In the Mode Key Start, the Inverter_Output_42V signal is at zero volts, the first power switcher 15 is turned on to connect the capacitor 13 to the inverter 12 to provide starting power and the second power switcher 16 is turned off.

F. In the Mode 5 Crank Time Out, the signal Inverter_Output_42V is at zero volts and the power switchers are turned off.

G. In the Mode 6 Power Generation, the signal Inverter_Output_42V is equal to the setting Recommended_Voltage_Setting_42V, the first power switcher 15 is turned off and the second power switcher 16 is turned on to connect the battery 14 to the inverter 12 for charging.

H. In the Mode 7 Torque Boost, the Inverter_Output_42V signal is zero, the first power switcher 15 is turned on to connect the capacitor 13 to the inverter 12 and the second power switcher 16 is turned off.

I. In the Mode 8 Auto Start, the Inverter_Output_42V signal is zero, the first power switcher 15 is turned on to connect the capacitor 13 to the inverter 12 and the second power switcher 16 is turned off.

J. In the Mode 9 Auto Stop; Hold Caps Charged, the Inverter_Output_42V signal is at zero volts and the power switchers are turned off.

K. In the Mode A Regeneration; Charge Caps First, Then Battery, the Inverter_Output_42V signal is at 56 volts. If the Capacitor_Voltage is less than 56 volts, then a percentage charge of the capacitor 13 is made with the first power switcher 15 turned off and the second power switcher 16 pulse width modulated. Otherwise (ELSE), the signal Inverter_Output_42V is equal to the setting Recommended_Voltage_Setting_42V, the first power switcher 15 is turned off and the second power switcher 16 is turned on to connect the battery 14 to the inverter 12.

The Modes described in paragraphs A. through K. above are representative of a preferred control strategy. The independent control of the power switchers 15 and 16 permits other control strategies to be implemented using the power switchers control logic 21.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for providing electrical power for a hybrid vehicle comprising:
   an integrated starter-generator;
   an inverter connected to said integrated starter-generator;
   a passive storage means for storing electrical energy capable of energizing said integrated starter-generator;
   a first switch means connected between said inverter and said passive storage means for transferring electrical power between said inverter and said storage means in either direction;
   a battery means for generating electrical energy capable of energizing said integrated starter-generator;
   a second switch means connected between said inverter and said battery means for transferring electrical power between said inverter and said battery means in either direction; and a control means connected to said first and second switch means for selectively turning each of said first and second switch means on and off.

2. The apparatus according to claim 1 wherein said control means turns each of said first and second switch means on and off to charge said battery means from said passive storage means.

3. The apparatus according to claim 2 wherein said control means turns each of said first and second switch means on and off by pulse width modulation.

4. The apparatus according to claim 1 wherein said control means turns said first switch means on to provide electrical power from said passive storage means to operate said integrated starter-generator.

5. The apparatus according to claim 1 wherein said control means turns said second switch means on to charge said battery means from said integrated starter-generator.

6. The apparatus according to claim 1 wherein said control means turns said second switch means on and off by pulse width modulation to charge said battery means from said integrated starter-generator.

7. The apparatus according to claim 1 wherein said first switch means includes a diode permitting current flow from said inverter to said passive storage means.

8. The apparatus according to claim 7 wherein said second switch means includes a diode permitting current flow from said battery to said passive storage means.

9. The apparatus according to claim 1 wherein said second switch means includes a diode permitting current flow from said battery to said inverter.

10. The apparatus according to claim 1 wherein said passive storage means is a capacitor.

11. An apparatus for providing electrical power for an integrated starter-generator in a hybrid vehicle comprising:

a capacitor means for storing electrical energy at a first voltage;

a first switch means connected to said capacitor means for transferring electrical power between said integrated starter-generator storage and said capacitor means;

a battery means for storing electrical energy at a second voltage lower than the first voltage;

a second switch means connected to said battery means for transferring electrical power between said integrated starter-generator and said battery means, said first and second switch means being connected at a junction; and a control means connected to said first and second switch means for selectively turning each of said first and second switch means on and off to provide electrical power at the junction.

12. The apparatus according to claim 11 wherein said first and second switch means each include a MOSFET responsive to control signal generated by said control means.

13. The apparatus according to claim 12 wherein said first and second switch means each include a diode connected across said MOSFET, said diode permitting current flow from said battery means to said junction and from said junction to said capacitor means.

14. The apparatus according to claim 11 wherein first voltage is approximately 56 volts.

15. The apparatus according to claim 11 wherein second voltage is approximately 36 volts.

16. The apparatus according to claim 11 wherein said first and second switch means selectably transfer electrical power between said capacitor means and said battery means for charging said battery means.

* * * * *